United States Patent
Canterberry et al.

[19]

[11] Patent Number: 6,149,193
[45] Date of Patent: *Nov. 21, 2000

[54] VARIABLE OUTPUT INFLATOR

[75] Inventors: J B Canterberry, Apollo Beach; Donald Bowers, Tampa; Daniel Steven Solomon, Lakeland, all of Fla.

[73] Assignee: Breed Automotive Technology, Inc., Lakeland, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/370,347

[22] Filed: Aug. 6, 1999

[51] Int. Cl.[7] .......................... B60R 21/28; C06B 35/00; C06B 31/00; C06B 31/28; C06B 31/32
[52] U.S. Cl. .......................... 280/741; 280/740; 280/742; 149/35; 149/45; 149/46; 149/47; 149/61; 149/62
[58] Field of Search .................................. 280/740, 741, 280/742

[56] References Cited

U.S. PATENT DOCUMENTS

| | | | |
|---|---|---|---|
| 4,998,751 | 3/1991 | Paxton et al. ........................... | 280/741 |
| 5,186,491 | 2/1993 | Yoshida et al. ......................... | 280/741 |
| 5,221,109 | 6/1993 | Marchant ................................ | 280/736 |
| 5,346,254 | 9/1994 | Esterberg ................................ | 280/741 |
| 5,368,329 | 11/1994 | Hock ...................................... | 280/741 |
| 5,398,966 | 3/1995 | Hock ...................................... | 280/736 |
| 5,400,487 | 3/1995 | Gioutsos et al. ........................ | 280/735 |
| 5,460,405 | 10/1995 | Faigle ..................................... | 280/735 |
| 5,558,367 | 9/1996 | Cuevas ................................... | 280/737 |
| 5,564,743 | 10/1996 | Marchant ................................ | 280/741 |
| 5,582,428 | 12/1996 | Buchanan et al. ....................... | 280/741 |
| 5,630,619 | 5/1997 | Buchanan et al. ....................... | 280/741 |
| 5,709,406 | 1/1998 | Buchanan ................................ | 280/737 |
| 5,765,866 | 6/1998 | Canterberry et al. . | |
| 5,839,754 | 11/1998 | Schluter et al. ......................... | 280/736 |
| 5,934,705 | 8/1999 | Siddigui et al. ......................... | 280/741 |
| 6,019,389 | 2/2000 | Burgi et al. ............................. | 280/736 |

FOREIGN PATENT DOCUMENTS 11048905  2/1999  Japan .

Primary Examiner—Michael J. Carone
Assistant Examiner—Glenda L. Sánchez
Attorney, Agent, or Firm—Beth Vrioni

[57] ABSTRACT

This invention relates to a multi-stage gas bag inflator, operable initially, when activated, to cause the gas bag to deploy slowly and then, after a delay, to deploy rapidly, includes a housing having at least first and second chambers of preferably different size, separated by a bulkhead. One chamber is preferably smaller since it can be used to produce a smaller amount of gas to cause the initial slow deployment of the gas bag. A gas generant charge is ignited in the first chamber, and after some delay, a gas generant charge in the second chamber is ignited. The multi-stage inflator according to this invention can be used to provide the varying inflation rates needed to adjust the inflation of air bags to accommodate the severity of the collision and the position of the occupants. The inventive inflator is small in size and economical to produce.

11 Claims, 4 Drawing Sheets

VARIABLE OUTPUT INFLATOR

TECHNICAL FIELD

The present invention relates to gas generators or inflators, for inflating vehicle restraint cushions, commonly known as air bags. Air bags have been used for some time to provide impact protection to occupants of passenger vehicles. More particularly, this invention relates to an improved inflator that can provide varying rates of inflation of the air bag. The rate of air bag inflation can be controlled through the inventive inflator to adapt to various crash conditions and/or occupant positions.

BACKGROUND OF THE INVENTION

In air bag systems there is typically a cushion or bag which, upon a collision, is inflated to provide protective cushioning to the passenger. To inflate the cushion such systems employ an inflator to produce a quantity of inflation gas. Various inflators operating upon different principles are known. For each operating principle, there is a slight difference in performance such as the rise and fall of pressure in the cushion over time. As such, for different applications, inflators operating on different principles are preferred.

For air bag systems to be effective they must be activated immediately at the moment of collision and a proper inflating time is an absolute necessity. On the other hand, if the air bag inflates too rapidly, the passenger may be injured by the inflating air bag. For example, assume that a child is standing on the passenger seat in front of the instrument panel. If the air bag is activated, the sudden and rapid inflation of the bag could throw the child off the seat and may cause injury to the child. In order to prevent such injury by the inflating air bag, it is necessary that the inflating speed of the bag be controlled. Therefore, a multi-stage air bag device has been proposed in order to satisfy these contradictory requirements as described above.

The multi-stage air bag device works such that the air bag is inflated to a predetermined level during the initial stage of the collision and after a brief interval it is inflated completely. In prior air bag devices, a predetermined amount of gas is generated in the initial stages of collision so as to inflate the air bag to some degree. A great quantity of gas is then generated after an interval established somewhere between several milliseconds to several tens of milliseconds. With such a multi-stage air bag device, the chances of injury to an out-of-position passenger can be reduced and a wider range of crash conditions can be accommodated.

The time intervals between the initial stage deployment and the subsequent stage deployments are set in relation to the quantity of gas used in the first stage and other factors. However, an improper interval adversely affects the air bag as a safety device. For example, if the interval is too short, it may cause injury, but if the interval is too long, the shock absorption action of the air bag will be weakened and may result in injuries to the vehicle occupant. For this reason, a high degree of precision is required for the delayed ignition signal generator whose function it is to activate the first gas generant and thereafter the second and third gas generant.

A typical delayed ignition signal generator is made up of complex electronic circuitry. Because of the complexity of the system and the attended high cost, its applicability to such infrequently used devices such as air bags, is limited. While such adaptive systems are desirable, they typically require additional components on the inflator. Further, it is even more difficult to provide an adaptive pyrotechnic inflator which will meet the size requirements for vehicles, especially for driver side and side impact applications.

BACKGROUND ART

Numerous approaches have been suggested for adaptive air bag systems. For example, U.S. Pat. No. 4,998,751 to Paxton et al. discloses a two-stage automotive air bag inflator that comprises an elongated housing with a bulkhead located in the housing which separates two beds of pyrotechnic gas generant. The bulkhead in the Paxton et al. inflator is perforated and the inflator uses two igniter tubes. This patent also teaches that the igniters are different in that they have different burn rates and that a fuse runs between the two-igniter tubes.

U.S. Pat. No. 5,368,329 to Hock discloses a dual stage inflator where the surface area of the gas generant wafers is increased by shattering the wafers through the use of a dual function squib.

U.S. Pat. No. 5,400,487 to Gioutsos et al. discloses a variable inflation system for air bags that uses a processor for selecting which of a plurality of gas generators will be individually initiated to provide optimal protection to the occupant. The processor in conjunction with acceleration sensors and occupant position sensors determines the number of gas generant beds to be ignited and the delay between each firing.

U.S. Pat. No. 5,564,743 to Marchant discloses a multiple stage air bag inflator system wherein the inflator housing contains two separated chambers, each containing gas generating material and an ignition system. The wall that separates the two chambers has a frangible section designed to rupture in response to a predetermined level of gas pressure in one of the chambers, thus providing fluid communication between the chambers.

U.S. Pat. No. 5,630,619 to Buchanan et al. discloses a hybrid adaptive inflator for air bags. While the present invention is not concerned with hybrid inflators, this patent does teach the use of two pressure vessels and pyrotechnic heating devices in each pressure vessel. The two vessels are connected to a central chamber which comprises burst discs. This patent is representative of the state of the art in adaptive inflator design, however, this patent nor any of the prior art discloses or suggests the present multi-stage inventive inflator wherein the combustion process occurs in a discreet combustion chambers and exits into discreet filtering/cooling chambers. The prior art also fails to suggest a multi-chambered inflator, which requires the gas to make a ninety degree (90°) turn while passing, under pressure, through a heat sink (filter).

U.S. Pat. No. 5,765,866 to Canterberry et al. discloses an air bag inflator comprising a metal housing, a knitted wire filter, stainless steel burst foils and a gas generant composition that contains from 5 to 25 weight % mica. This patent fails to suggest a multi-stage inflator that contains at least two chambers which have different volumes and amounts of pyrotechnic gas generant.

The prior art approaches for providing a more controlled gas bag inflation, that is tailored to the needs of vehicle occupants advanced the state of the art. There is, however, a need and a demand for further improvement in reducing the complexity of the inflator system, reducing the number of failure modes of the inflator, and the cost of inflator fabrication.

SUMMARY OF THE INVENTION

An aspect of the present invention is to provide an adaptive, multi-stage pyrotechnic inflator which reliably provides gas to an automobile air bag over a large range of crash situations. Another aspect of the present invention is to provide an inflator of small size having selectively controllable performance characteristics to provide multiple level energy absorptive capabilities and reduce the space occupied by the inflator in the vehicle cabin.

Yet another aspect of the present invention is to provide an inflator which is sufficiently small for use in a steering wheel for driver side protection, in the dashboard for passenger protection and in the automobile doors for side impact protection.

One embodiment of the invention, where there are three (3) combustion chambers, is especially useful in situations known as "second impact" collisions. Second impact collisions occur when, for example, a vehicle collides with a guardrail and then, after traveling a short distance, collides with another vehicle. Using the three (3) chambered inflator according to the present invention, the electronic controller would fire two of the chambers to position and protect the vehicle occupant during the collision with the guardrail and then fire the third chamber upon collision with the other vehicle.

Thus, there is disclosed a multi-stage air bag inflator for a vehicle comprising:
a. a housing being divided into at least two chambers which are adjacent to each other and separated by an impermeable bulkhead;
b. a first combustion chamber containing a solid gas producing material; provided in one of the at least two chambers;
c. a second combustion chamber containing a solid gas producing material provided in another one of the at least two chambers;
d. a first ignition means for igniting said gas producing material in the first combustion chamber;
e. a filter/cooling chamber associated with said first combustion chamber;
f. a second ignition means for igniting said gas producing material in said second combustion chamber;
g. a filter/cooling chamber associated with said second combustion chamber; and
h. aperatures in said first and second filter/cooling chambers, wherein said aperatures are sealed with a foil.

There is further disclosed a variable output inflator for vehicle air bags comprising:
a. an elongated housing including a bulkhead that separates the housing into at least two chambers;
b. each chamber comprising a combustion chamber, a filter/cooling chamber and ignitor means;
c. each combustion chamber including solid gas generating material and ignitor means in spaced relationship from said gas generating material for igniting said gas generating material;
d. said filter/cooling chamber including knitted wire and said cooling chamber is separated from said combustion chamber by a perforated pellet retainer; and
e. said filter/cooling chamber having at its distal end from the combustion chamber, aperatures along the circumference of the filter/cooling chamber for directing generated gas to a vehicle air bag.

The inflator according to this invention includes two or more discreet chambers, each containing a quantity of pyrotechnic gas generant in a combustion chamber and filter/cooling chamber. Each chamber additionally includes an ignitor to initiate the burning of the gas generant. To provide adaptive performance, one, or the other, or both of the igniters may be fired, depending upon the severity of the collision and position of the occupants. The gas produced upon combustion of the pyrotechnic generant passes through a filter/cooling chamber, generally in a direction parallel to the axis of the chamber, and then through exit portals to inflate the cushion, after being diverted by the bulkhead about ninety degrees (90°). A unique aspect of the inventive pyrotechnic inflator is that the design requires the generated gas to make a 90° turn in the filter/cooling media prior to exiting the inflator. The change of direction and interaction with the filter/cooling media results in the deposition of most of the particulate produced by the pyrotechnic gas generant.

Prior to exiting the inflator housing, the combustion gas from each discreet combustion chamber passes through a discreet filtering/cooling chamber. The novel design also allows for better control of inflator ballistics and reduces the chances of "cook off" or unintended ignition of gas generant in an undeployed chamber.

An additional aspect of the invention is to provide an improved multi-chamber inflator providing "S-shaped" pressure versus time curves. The shape of the curve can be altered in the inventive inflator by simultaneously firing the two ignitors or they may be fired separately with an appropriate time delay therebetween. The curve can also be modified through making the discreet chambers of different size and with different amounts of pyrotechnic gas generant, different size filtering/cooling chambers and with different amounts of filtering/cooling material.

Yet another aspect of the invention is to provide an inflator comprising an elongated housing, an impervious bulkhead located in said housing at an intermediate position along the length thereof, a pyrotechnic gas generant contained within said housing comprised of first and second gas generating charges of gas generating material extending in end-to-end relation therein with one of said charges being located on one side of said bulkhead and the other charge being located on the other side thereof, and initiator means in said housing comprising first and second igniters associated, respectively, with said first and second gas generating charges for effecting ignition thereof and first and second filter/cooling chambers associated with said first and second gas generating charges.

The gas produced in the inventive inflator exits the combustion chamber through a plurality of openings in a gas generant pellet retainer plate and then enters into the filter/cooling chamber. The cooling chamber is filled with a heat absorbing material such as ceramic pellets, metal shavings, expanded metal chips, knitted wire and the like. The heat absorbing material cools the gas and filters particulates from the combustion gases. The gas is then forced to make a ninety degree turn to exit the inflator through the exit portals along the circumference of the filter/cooling chamber. The number and geometry of the exit portals have an impact upon the combustion pressure in the combustion chamber.

The gases generated upon the ignition of the generant generally travel in a direction that is parallel to the axis of the housing while passing through the filtration cooling material. The gases, upon impacting the bulkhead, turn 90° and exit through the exit aperatures. Thus, there is further disclosed a multi-stage air bag inflator, as described above, wherein said aperatures, said bulkhead and said combustion chambers are in a positional relationship that requires the gases generated by said solid gas producing material to impact upon said bulkhead and change direction about 90° before exiting said aperatures.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this summary of the invention, a detailed description follows with reference being made to the accompanying drawings which form part of the specification in which like parts are designated by the same references numbers and of which.

DETAILED DESCRIPTION OF THE INVENTION

Figure 1:
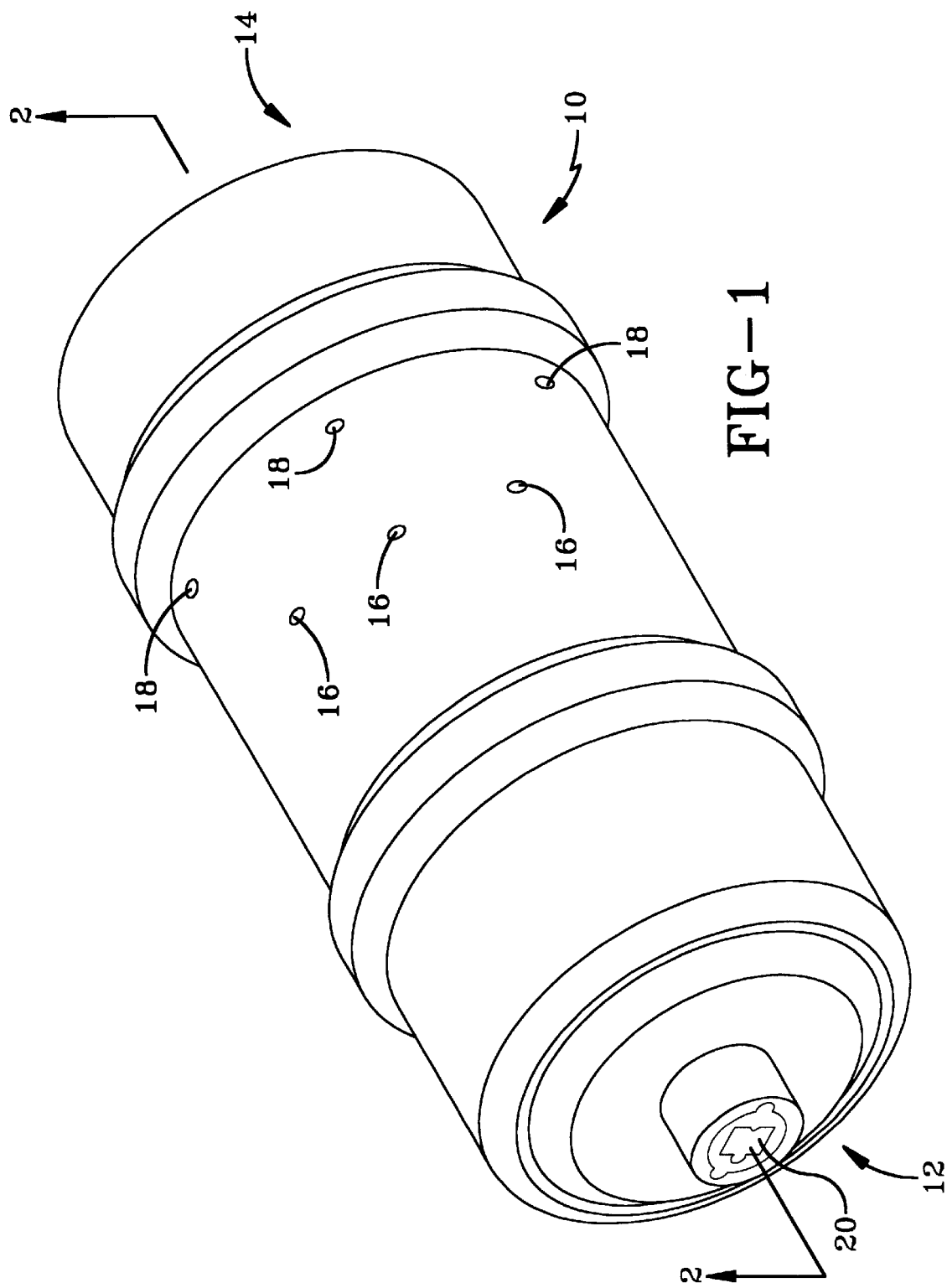
FIG. 1 is a perspective view of the exterior of an embodiment of an inflator according to the invention.

With reference to FIG. 1, an embodiment of an inflator according to the invention is generally designated by reference numeral 10. The inflator 10 includes first and second ends 12 and 14 respectively. While various forms are possible, such as a spherical, cubic and the like, it is preferred that the inflator have a generally cylindrical shape. The inflator has exit portals 16 and 18 placed about its circumference. Exit portals 16 are associated with the first chamber (not shown) while exit portals 18 are associated with the second chamber (not shown). The inflator 10 also has two electrical connectors that are associated with two discreet ignitors (one for each combustion chamber), a first electrical connector 20 for the first igniter and a second electrical connector (not shown) at the second end 14.

Figure 2:
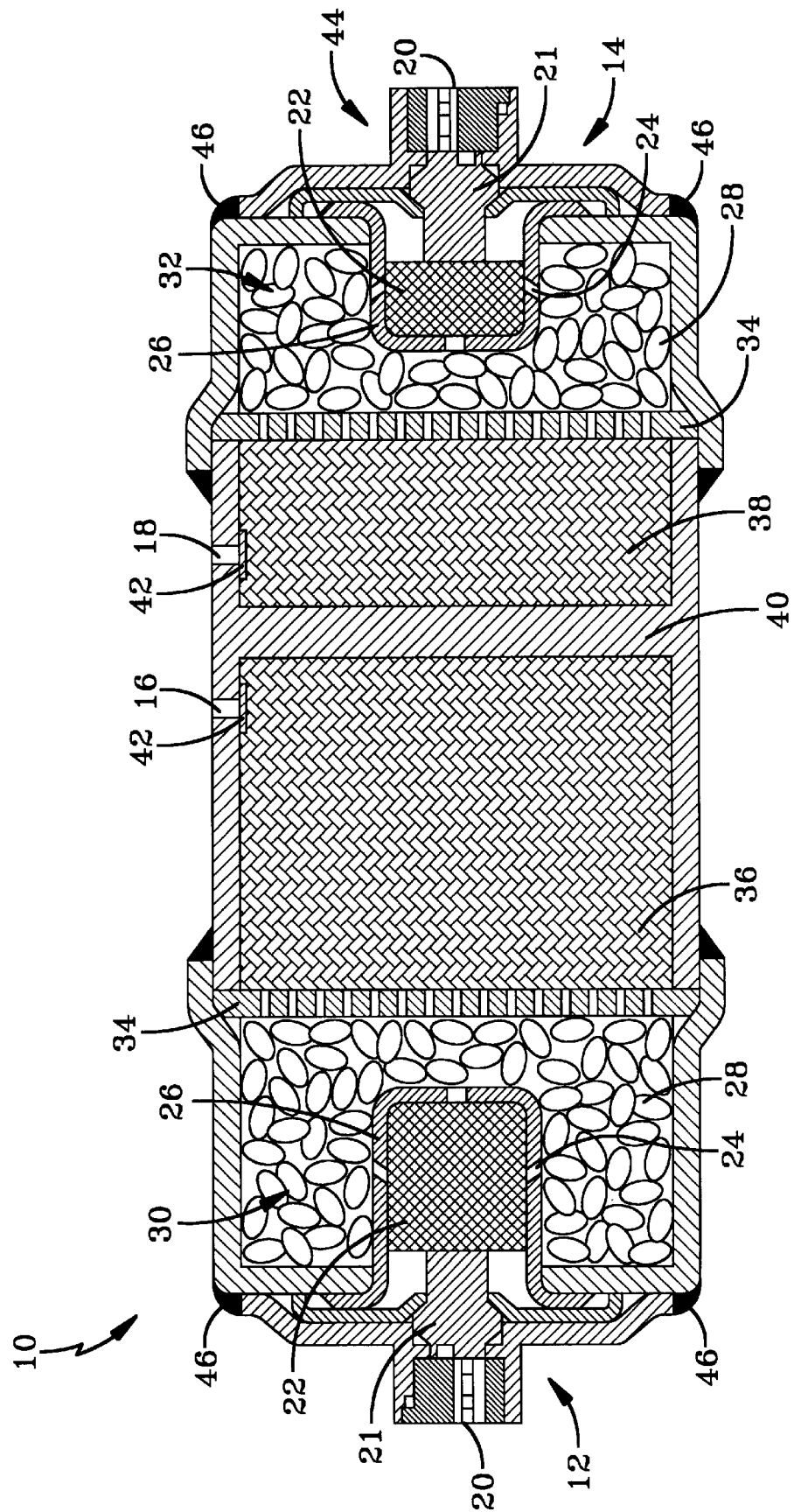
FIG. 2 is a cross sectional view of an inflator according to the invention taken along line 2—2 of FIG. 1.

With reference to FIG. 2, which is the inflator 10 of FIG. 1 in cross section, taken along the line 2—2 of FIG. 1. There is shown a generally cylindrical inflator with a first end 12 and a second end 14. Each end has an electrical connector 20 for receiving an electrical signal when the inflator is to be fired. The connectors 20 are in association with squibs 21 which ignite the enhancer compositions 22. In the event of a crash, an electronic module (not shown) delivers an electrical impulse to the selected squib which lights an ignition train, which in turn lights the gas generant pellets 28. The connectors 20 supply electrical current to the squibs. The squibs comprise a filament that ignites the enhancer composition. The enhancers 22 may be any of a number of known compositions that are readily ignited by the squibs and burn at a high rate and temperature. The gases and hot burning particles from the ignited enhancer 22 exit through portals 24 in the enhancer housing 26. The gas and particles then ignite the gas generant pellets 28 in the first combustion chamber 30 and/or the second combustion chamber 32. The gases produced by the burning enhancer and the gas generate pellets then pass through a pellet retention plate 34. The retention plates may comprise a metal plate with numerous holes drilled through it, a screen or a sheet of expanded metal. The retention plate 34 simply retains the pellets in the combustion chambers 30 and 32 and allows for the essentially unrestricted movement of the gas from the combustion chambers 30 and 32 to the first filtering/cooling chamber 36 and the second filtering/cooling chamber 38. The two filtering/cooling chambers 36 and 38 are separated by a solid bulkhead 40. The bulkhead 40 is placed along the axis of the inflator 10 to provide for equal or different volumes in the first and second chambers. It should be understood that the term chamber includes the combustion chamber and the filtering/cooling chamber wherein the bulkhead 40 separates the two chambers. Depending upon the actual service requirements of the inventive inflator, the first chamber may be from 20 to 80% of the total inflator volume. In a more preferred embodiment, the first chamber is 55–75% of the total inflator volume. In similar fashion, the first combustion chamber may contain from 20 to 80% of the total amount of the gas generant composition, more preferably from about 55 to 75% and most preferably from about 55 to about 65%. In embodiments where there are three or more chambers, the gas generant may be divided equally among the chambers or unequally, depending upon the design requirements of the inflator.

The gases after passing through the filtration/cooling chambers 36 and 38, exit the inflator 10 at exit portal 16 for the first chamber and exit portal 18 for the second chamber. The interior of the exit portals are preferably covered with a foil 42 such as aluminum or stainless steel foil to prevent the incursion of water vapor. This foil 42, sometimes referred to as a "burst foil" is typically of a thickness of from 0.01 to about 0.20 mm. The foil is typically adhered to the interior wall of the filtration/cooling chamber through the use of an adhesive. The filtration/cooling chambers 36 and 38 are filled with any heat absorbing material such as knitted wire, ceramic beads, metal shavings and the like. The heat absorbing material serves to reduce the temperature of the generated gas and to trap any slag or particulate matter produced during the combustion of the gas generant 28.

The inflator 10 can be constructed of any metal such as steel and aluminum. The inflator is preferably constructed of steel and can be cast or milled into the various components as illustrated in FIG. 2 and then assembled through the use of welds 46. Preferably, the welds are created by an inertia welding process similar to that known in the industry.

Figure 3:
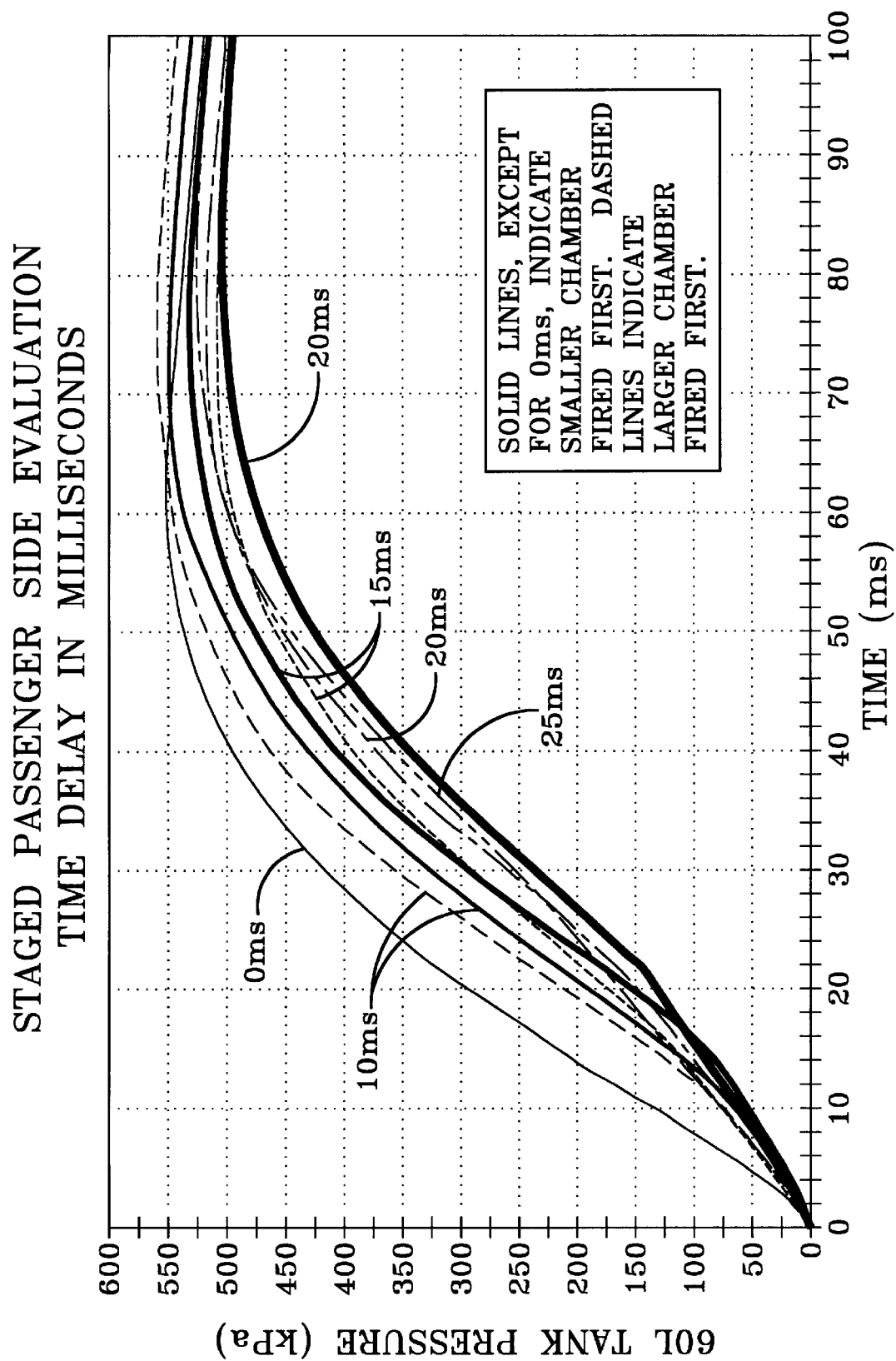
FIG. 3 illustrates a number of pressure-time curves from the firing of the inventive inflator with time delays between the firing of the first chamber and the second chamber varying from 0 to 25 micro seconds.

FIG. 3 is a graphical representation of a number of firings of one embodiment of the inventive inflator. Inflators as illustrated in FIG. 2 were prepared as described below and ignited in a 60 liter tank fitted with a pressure transducer. The solid lines indicate the tests where the smaller chamber was fired first followed by a time delay of 0, 10, 15 or 20 milliseconds before igniting the larger chamber. The dashed lines represent the tests where the larger chamber was fired first, followed by a time delay of 10, 15, 20 or 25 milliseconds before firing the smaller chamber.

Figure 4:
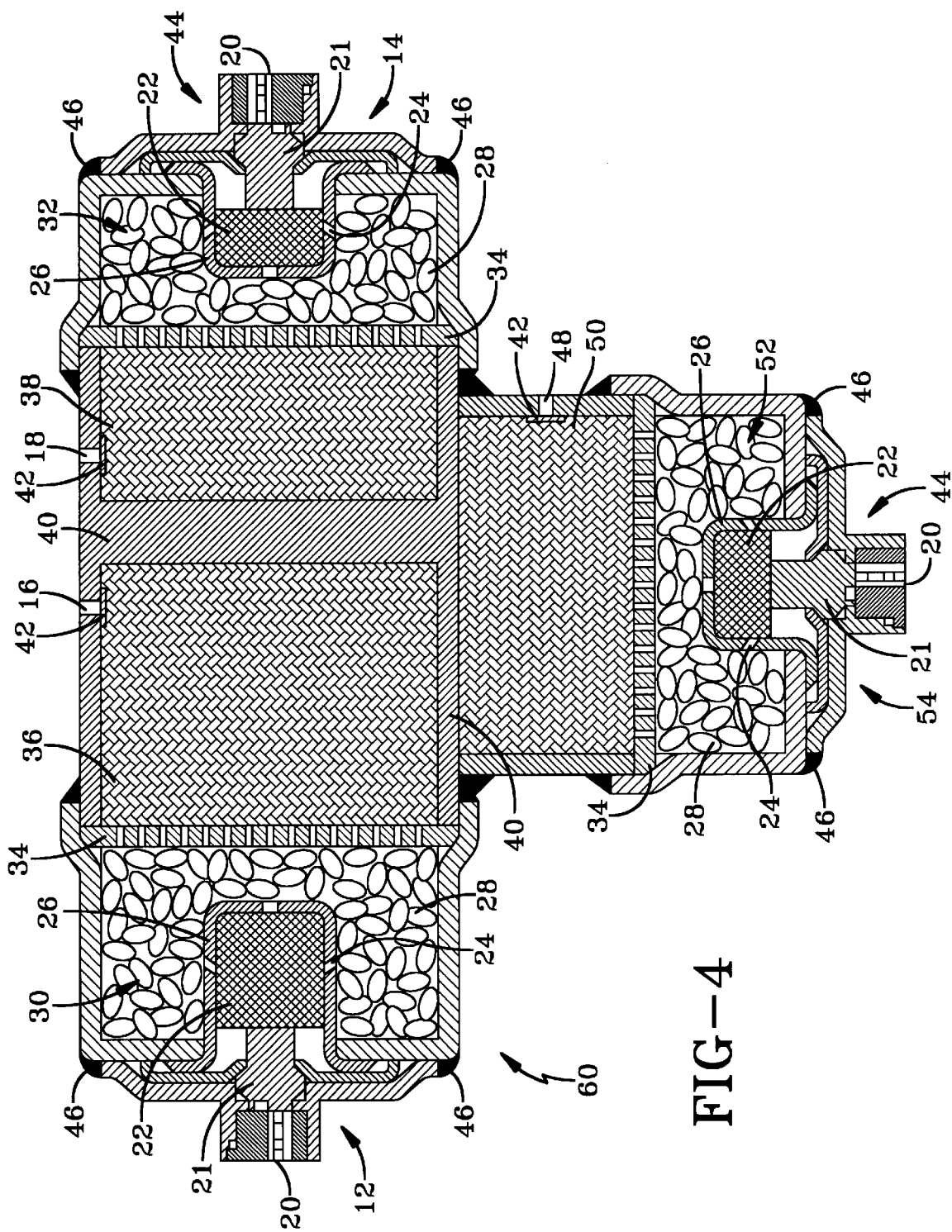
FIG. 4 is a cross-sectional view of a three (3) chambered inflator according to the invention.

With reference to FIG. 4, and the description provided for FIG. 2, an embodiment of an inflator, in cross-section, according to the invention is generally designated by reference number 60. The inflator 60 includes first and second ends 12 and 14, respectively, and a third end 54. In this configuration, the inventive multi-stage inflator is "T" shaped with the generally cylindrical shapes of each chamber intersecting at a bulkhead 40. The third end 54 has exit portals 48 placed about the circumference of the third filtering/cooling chamber 50. The inflator 60 has three (3) electrical connectors 20 associated with three (3) discrete ignitor assemblies 44 (one for each combustion chamber).

The method of operation is identical to that described for FIG. 2, except that a third combustion chamber 52 and a third filtering/cooling chamber 50 are present. As disclosed previously, the combustion chambers 30, 32 and 52 may contain equal amounts of gas generant pellets 28, or, preferably unequal amounts. In this embodiment, the third combustion chamber 52 contains an amount of gas generant that is less than the first combustion chamber 30 and more than the second combustion chamber 32. In similar fashion, the volume and therefore the amount of the media in the third cooling/filtration chamber 50 is preferably different from the other two cooling/filtration chambers 36 and 38. A solid bulkhead 40 separates each of the cooling/filtration chambers 36, 38 and 50.

ILLUSTRATIVE EMBODIMENT OF THE INVENTION

In operation, the inventive inflator is connected to a controller (not shown) which produces appropriate electrical signals upon sensing a collision. Depending upon the severity of the collision, and other factors such as the position of a passenger in the seat, the controller will cause one or more of the ignitor squibs to fire. The time delay between the firing of the chambers and the order of firing will also be calculated by the controller. In this manner, the amount of gas fed to the cushion may be varied to inflate the cushion to varying "hardness", or to create different pressure levels over time in the cushion or to address the "second impact" collision situation.

As disclosed above, the two or more combustion chambers may contain the same amount of gas generant or different levels of gas generant. For example, the first chamber may generate 70% of the total gas volume and the second chamber may comprise 30% of the total volume. It thus becomes apparent that the inflator 10 may be modified for various applications and provide a wide variety of outputs.

It is an aspect of the present invention to provide a new and improved multi-stage air bag inflator system that functions optimally over a wide range of crash situations. It is another aspect of the present invention to provide a new and improved multi-stage air bag inflator. It is yet another aspect of the present invention to provide a new and improved multi-stage air bag inflator having controllable performance characteristics to provide multiple level energy absorptive capabilities.

The foregoing and other aspects and advantages of the present invention are accomplished in a new and improved multiple stage air bag inflator system having an inflator including a housing having gas discharge ports in direct communication with an air bag to be inflated. The housing includes at least two separated chambers, each containing a quantity of gas generating material for producing gas and an ignition system therefor for rapidly inflating the air bag. The housing has an internal impermeable wall (bulkhead) forming the separated chambers. The ignition system in one or more chambers is activated to provide a selected amount of gas for inflation of the air bag. Also, a time delay means is included in the system for activating the multiple ignition systems in response to an identified crash type.

DETAILED DESCRIPTION OF A PREFERRED EMBODIMENT

Referring to FIG. 2, an inflator 10 was constructed of steel using conventional techniques and equipment. Welds 46 where placed at the junction of the various parts after filling the combustion chambers 30 and 32 with pellets of a non-azide gas generant. Representative gas generant compositions useful in the inventive inflator housing include fuels such as the alkali metal azides, aminotetrazoles, tetrazoles, bitetrazoles, triazoles, the metal salts thereof, guanidine nitrate, aminoguanidine nitrate and mixtures thereof; in combination with an oxidizer such as the alkali and alkaline earth metal nitrates, chlorates, perchlorates, ammonium nitrate and mixtures thereof. A preferred gas generant comprises a mixture of nitroguanidine and ammonium nitrate. Typically, the gas generant or gas producing material can comprise about 15 to about 70 weight % fuel, about 2 to about 80 weight % oxidizer and about 1 to about 30 weight % other materials, such as coolants and processing aids. The gas generant can be formed into various shapes using various techniques known to those skilled in the art.

It is desirable to pelletize the gas generant composition. To do so, up to about 5.0 weight %, typically 0.2–5 weight % of a pressing aid or binder may be employed. These may be selected from materials known to be useful for this purpose and include molybdenum disulfide, graphite, elastomers, polyesters, boron nitride, silicon dioxide, talc, calcium stearate and clays.

The gas generant composition may optionally contain a catalyst at up to about 3 weight %, typically between about 1 and about 2 weight %. Copper chromate and malorie blue (a ferro-ferric cyanide) are representative combustion catalysts.

In these test inflators and with reference to FIG. 2, the first combustion chamber 30 contained 35 grams of generant pellets 28. The second combustion chamber 32 contained 25 grams of the generant pellets 28. The squibs 21 are connected by electrical connectors 20 to sensor means (not shown) which detects when the vehicle is engaged in a collision. The sensor initiates a firing signal which activates one or both of the squibs 21, which ignites the enhancer composition 22 which in turn, ignites the gas generating composition 28. A controller (not shown) determines which squib to fire first and the time delay (if any) between the firing of the squibs and therefore the two combustion chambers.

The ignitor assembly 44 is attached to the inflator housing through any useful means and is preferably attached via a weld 46. As used herein, a "squib" is understood to be any device that will initiate the first fire in the combustion train and may be, for example, an electrical device having two (2) electrodes insulated from one another and connected by a bridge wire. The bridge wire is preferably embedded in one or more layers of a pyrotechnic material designed to give a flash of heat of sufficient intensity to ignite the enhancer composition 22. Those skilled in the art will understand that various electrical, electronic, mechanical and electromechanical initiators, such as a semi-conductor bridge initiator, can be used in the present invention.

The gas generant 28 is ignited by the very hot gases and particles that are generated by the combustion of the enhancer composition 22, which exit the ignitor assembly portals 24. The resulting ignition of the gas generant results in the production of gases which pass through the pellet retainer 34 and then through the cooling/filtration chambers 36, 38. In general, the gases generated upon the ignition of gas generant pellets 26 pass through the pellet retainer 34 and proceed in a direction essentially parallel to the axis of the chamber while passing through the filtration/cooling media contained within the filtration/cooling chambers 36, 38. The gases, upon impacting the bulkhead 40, are forced to turn 90° and exit through the aperatures 16, 18 after rupturing the burst foils 42.

The cooling/filtration chambers 36, 38 are filled with a filtration/cooling media such as ceramic chips, metal chips or preferably knitted wire. The knitted wire is preferably made of stainless steel, however, low carbon steel may be used. The combustion gases, after passing through the cooling/filtration material exit the inflator housing 10 at exit portals 16 and 18. A number of exit portals 16 and 18 can be varied and are spaced about the circumference of the housing at the end of the cooling/filtration chambers distal to the combustion chambers. The exit portals 16 and 18 are preferably sealed with a foil 42, preferably stainless steel burst foil, on the inside of the housing. When the pressure inside the chambers 36, 38 exceeds a given value, the foils rupture and the gases escape the inflator through aperatures 16 and 18 which then inflate the air bag (not shown).

EXAMPLE I

Testing of Inflator

Eight (8) inflators substantially as described above and in FIG. 2 were constructed wherein the smaller combustion chamber contained 25 grams of ammonium nitrate/nitroguanidine gas generant pellets. The larger chamber was filled with 35 grams of gas generant. Compressed knitted 304-stainless steel wire (0.023") was placed in the cooling/filtration chambers; 25 grams in the smaller chamber and 50 grams in the larger chamber. The enhancers contained 2 and 4 grams of a conventional enhancer composition, respectively. The assembled inflators were evaluated in a 60 liter test tank fitted with equipment to record the pressure and time profile. The inflators were installed into the tank and ignited. The resulting pressure versus time curves are found in FIG. 3. These data clearly indicate that the inventive inflator can provide a broad range of pressures at a given point in time. For example, using the dual chambered inflator according to the invention, a pressure of from 125 to 300 kPa can be delivered at 20 milliseconds (ms) post ignition. This range of pressures can be accomplished through firing the smaller chamber first and then firing the larger chamber 20 ms later for the low pressure of 125 kPa and by firing both chambers simultaneously for the high pressure of 300 kPa.

EXAMPLE II

Particulate and Gas Analysis

Three inflators were assembled as described in Example I and were evaluated in a 100 cubic foot test chamber. This test is designed to simulate the interior volume of the standard automobile. Gas analysis and particulate analysis is also possible using this test. The test equipment consisted of a 100 cubic foot steel chamber containing a steering wheel simulator. To the chamber was attached a vacuum pump, a bubble flow meter, filters and a Fourier Transform Infrared Spectrophotometer (FTIR). The inflator was attached to the simulated steering wheel assembly within the chamber, the chamber was sealed and the gas generant ignited. Gas samples were analyzed using the FTIR at zero time (background) at a 1, 5, 10, 15 and 20 minute intervals from ignition. Airborne particulate production can also be measured using the 100 cubic foot test chamber by filtering post-ignition air from the chamber through a fine filter and measuring the weight gained by the filter.

The airborne particulate was collected using a single stage collection device. The quantity of airborne particulate was determined using an analytical balance. Post-analysis particulate filters were dried for two hours at 104° C. to determine the level of water or volatile materials in the filters. No detectable mass loss was observed. Table 1 contains the results from this testing. Two 25 ms delay tests were run and one 15 ms delay. In all three experiments, the large chamber was fired first.

TABLE 1

Airborne Particulate Effluent Data

|  | Example A 25 ms delay | Example B 25 ms delay | Example C 15 ms delay |
| --- | --- | --- | --- |
| Average Flow Rate (liters/minute) | 5 | 5 | 5 |
| Sampling Time (minutes) | 20.0 | 20.0 | 20.0 |
| Temperature (° C.) | 20 | 20 | 20 |
| Total Corrected Sample Volume (m3) | 0.101 | 0.101 | 0.101 |
| Filter 1: 0–5 minutes (mg) | 2.8 | 2.6 | 9.4 |
| Filter 2: 5–10 minutes (mg) | 1.4 | 1.5 | * |
| Filter 3: 10–15 minutes (mg) | 1.9 | 2.8 | * |
| Filter 4: 15–20 minutes (mg) | 1.7 | 1.3 | * |
| Total Particulate (mg) | 7.8 | 8.2 | 9.4 |
| Total Particulate Concentration (mg/m3) | 78 | 82 | 93 |

*Filter was not used in this time interval.

The gas samples were also analyzed for ammonia, benzene, carbon dioxide, carbon monoxide, formaldehyde, hydrogen chloride, hydrogen cyanide, methane, nitric oxide, nitrogen dioxide, sulfur dioxide and water vapor using the FTIR. Samples were transferred directly to the FTIR via six feet of ¼ inch OD fluoropolymer tubing. Table 2 contains the gaseous effluent results.

TABLE 2

Gaseous Effluent Toxicity Results

|  |  | Ammonia | Benzene | Carbon Dioxide | Carbon Monoxide | Formaldehyde | Hydrogen chloride | Hydrogen Cyanide | Methane | Nitric Oxide | Nitrogen dioxide | Sulfur dioxide | Water Vapor |
| --- | --- | --- | --- | --- | --- | --- | --- | --- | --- | --- | --- | --- | --- |
| Analysis Method |  | FTIR | FTIR | FTIR | FTIR | FTIR | FTIR | FTIR | FTIR | FTIR | FTIR | FTIR | FTIR |
| Detection Limit (ppm) |  | 5 | 5 | 50 | 10 | 2 | 2 | 2 | 5 | 2 | 0.5 | 5 | 500 |
| Analysis Delay (min) |  | 0.2 | 0.2 | 0.2 | 0.2 | 0.2 | 0.2 | 0.2 | 0.2 | 0.2 | 0.2 | 0.2 | 0.2 |
| EXAMPLE A | 1 | 6 | <5 | 1292 | 600 | <2 | <2 | <2 | 12 | 2 | 0.8 | <5 | 7833 |
|  | 5 | 8 | <5 | 1555 | 694 | <2 | <2 | <2 | 15 | 3 | 1.1 | <5 | 8779 |
|  | 10 | 8 | <5 | 1532 | 689 | <2 | <2 | <2 | 15 | <2 | 0.9 | <5 | 8828 |
|  | 15 | 7 | <5 | 1526 | 683 | <2 | <2 | <2 | 15 | 2 | 0.9 | <5 | 8620 |
|  | 20 | 8 | <5 | 1512 | 673 | <2 | <2 | <2 | 14 | 2 | 0.9 | <5 | 8385 |

TABLE 2-continued

Gaseous Effluent Toxicity Results

| | | Ammonia | Benzene | Carbon Dioxide | Carbon Monoxide | Formaldehyde | Hydrogen chloride | Hydrogen Cyanide | Methane | Nitric Oxide | Nitrogen dioxide | Sulfur dioxide | Water Vapor |
|---|---|---|---|---|---|---|---|---|---|---|---|---|---|
| | TWA 20* | 8 | <5 | 1508 | 677 | <2 | <2 | <2 | 15 | <2 | 0.9 | <5 | 8599 |
| EXAMPLE B | 1 | <5 | <5 | 1308 | 614 | <2 | <2 | <2 | 9 | <2 | <0.5 | <5 | 7032 |
| | 5 | <5 | <5 | 1531 | 700 | <2 | <2 | <2 | 11 | 2 | <0.5 | <5 | 8659 |
| | 10 | 6 | <5 | 1548 | 694 | <2 | <2 | <2 | 11 | 2 | <0.5 | <5 | 8485 |
| | 15 | 7 | <5 | 1499 | 683 | <2 | <2 | <2 | 11 | 2 | <0.5 | <5 | 8216 |
| | 20 | 8 | <5 | 1482 | 675 | <2 | <2 | <2 | 11 | <2 | <0.5 | <5 | 7997 |
| | TWA 20 | <5 | <5 | 1497 | 682 | <2 | <2 | <2 | 11 | <2 | <0.5 | <5 | 8238 |
| EXAMPLE C | 1 | <5 | <5 | 1333 | 645 | <2 | <2 | <2 | 13 | 3 | <0.5 | <5 | 6110 |
| | 5 | <5 | <5 | 1528 | 707 | <2 | <2 | <2 | 13 | 3 | <0.5 | <5 | 7037 |
| | 10 | 6 | <5 | 1508 | 689 | <2 | <2 | <2 | 13 | 3 | <0.5 | <5 | 6749 |
| | 15 | 8 | <5 | 1493 | 686 | <2 | <2 | <2 | 13 | 4 | <0.5 | <5 | 6626 |
| | 200 | 9 | <5 | 1491 | 692 | <2 | <2 | <2 | 13 | 3 | <0.5 | <5 | 6510 |
| | TWA 20 | <5 | <5 | 1488 | 688 | <2 | <2 | <2 | 13 | 3 | <0.5 | <5 | 6686 |

*TWA = 20-time weighted average at 20 minutes

Industrial Applicability

The automobile industry is constantly searching for an air bag inflator that can vary its output to meet varying demands during crash situations. The present inventive inflator achieves these goals in a low cost, easily produced and reliable inflator design.

In all cases it is understood that the above described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. A multi-stage air bag inflator for a vehicle comprising:
   a. a housing being divided into at least two chambers which are adjacent to each other and separated by an impermeable bulkhead;
   b. a first combustion chamber containing a solid gas producing material; provided in one of the at least two chambers;
   c. a second combustion chamber containing a solid gas producing material provided in another one of the at least two chambers;
   d. a first ignition means for igniting said gas producing material in the first combustion chamber;
   e. a filter/cooling chamber associated with said first combustion chamber;
   f. a second ignition means for igniting said gas producing material in said second combustion chamber;
   g. a filter/cooling chamber associated with said second combustion chamber, said filter chambers are positioned between said combustion chambers and said bulkhead, wherein the filter chambers, combustion chambers, and the bulkhead are in a positional relationship that requires the gases generated by said solid gas producing material to travel from the combustion chamber through the filter before impacting upon said bulkhead; and
   h. apertures in said first and second filter/cooling chambers, wherein said apertures are sealed with a foil.

2. The multi-stage air bag inflator according to claim 1 wherein said foil is stainless steel foil of a thickness of 0.091 to 0.20 mm, said foil further characterized by an adhesive on at least one surface of said foil.

3. The multi-stage inflator according to claim 1 wherein said aperatures are placed along the circumference of said inflator.

4. The multi-stage inflator according to claim 1 wherein said filter chambers are nonannular cylindrical.

5. The variable output inflator according to claim 1, wherein said apertures and said filter chambers are in a positional relationship that requires the gases generated by said solid gas producing material to change direction in the filter chamber before exiting said apertures.

6. A variable output inflator for vehicle air bags comprising:
   a. an elongated housing including an impermeable bulkhead that separates the housing into at least two chambers;
   b. each chamber comprising a combustion chamber, a filter/cooling chamber and ignitor means, wherein said filter chambers are nonannular cylindrical and are positioned between said combustion chambers and said bulkhead;
   c. each combustion chamber including solid gas generating material and ignitor means in spaced relationship from said gas generating material for igniting said gas generating material;
   d. said filter/cooling chamber including knitted wire and said cooling chamber is separated from said combustion chamber by a perforated pellet retainer; and
   e. said filter/cooing chamber having at its distal end from the combustion chamber, apertures along the circumference of the filter/cooling chamber for directing generated gas to a vehicle air bag.

7. The variable output inflator according to claim 6 wherein said apertures are sealed with a stainless foil, said foil is stainless steel foil of a thickness of 0.091 to 0.20 mm, said foil further characterized by an adhesive on at least one surface of said foil.

8. The variable output inflator according to claim 6 wherein said ignitor means comprises electrical, electronic, mechanical, electromechanical or semi-conductor bridge initiators.

9. The variable output inflator according to claim 6 wherein said aperatures, said bulkhead and said combustion chambers are in a positional relationship that requires the gases generated by said solid gas producing material to impact upon said bulkhead and change direction before exiting said aperatures.

10. The variable output inflator according to claim 6, wherein said apertures and said filter chambers are in a positional relationship that requires the gases generated by said solid gas producing material to change direction in the filter chamber before exiting said apertures.

11. The variable output inflator according to claim 6, wherein the filter chambers, combustion chambers, and the bulkhead are in a positional relationship that requires the gases generated by said solid gas producing material to travel from the combustion chamber through the filter before impacting upon said bulkhead.

* * * * *